(No Model.) 2 Sheets—Sheet 1.
J. ROSS.
CAR BRAKE AND STARTER.
No. 414,589. Patented Nov. 5, 1889.
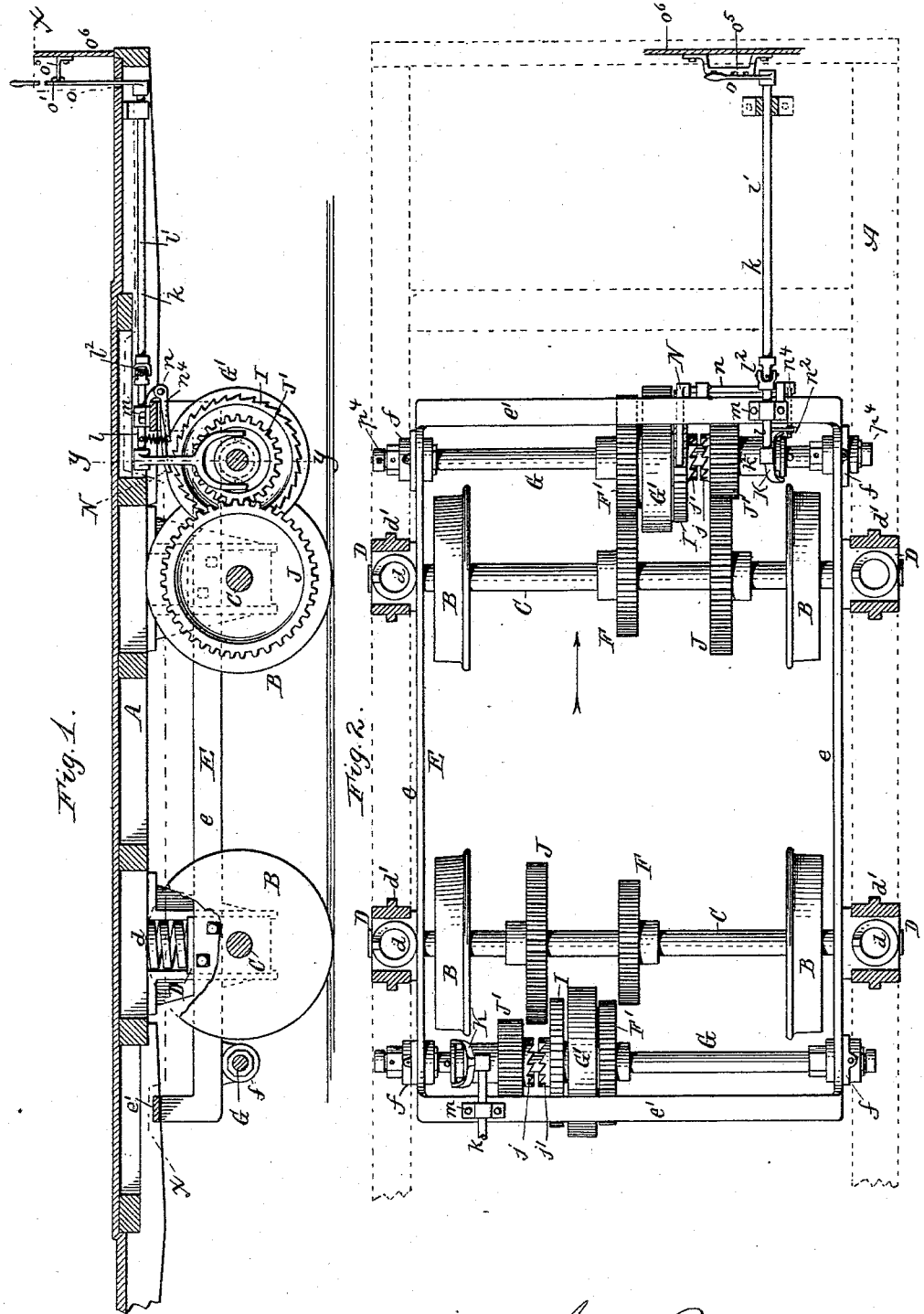

(No Model.) 2 Sheets—Sheet 2.

J. ROSS.
CAR BRAKE AND STARTER.

No. 414,589. Patented Nov. 5, 1889.

Witnesses.
Chas. J. Buchheit
Emil J. Neuhart

Josiah Ross Inventor.
By Wilhelm Bonner
Attorneys.

UNITED STATES PATENT OFFICE.

JOSIAH ROSS, OF BUFFALO, NEW YORK.

CAR BRAKE AND STARTER.

SPECIFICATION forming part of Letters Patent No. 414,589, dated November 5, 1889.

Application filed August 22, 1889. Serial No. 321,651. (No model.)

*To all whom it may concern:*

Be it known that I, JOSIAH ROSS, a citizen of the United States, residing at Buffalo, in the county of Erie and State of New York, have invented new and useful Improvements in Car Brakes and Starters, of which the following is a specification.

This invention relates to that class of car starters and brakes which are provided with a coiled spring which is wound from the axle of the car, so as to offer a resistance and stop the movement of the car, and which applies the power thus accumulated to the axle to assist in moving the car when it is desired to again start the same.

The object of my invention is to produce a simple, compact, and reliable mechanism of this character which can be easily manipulated and produced at comparatively small cost.

Figure 4:
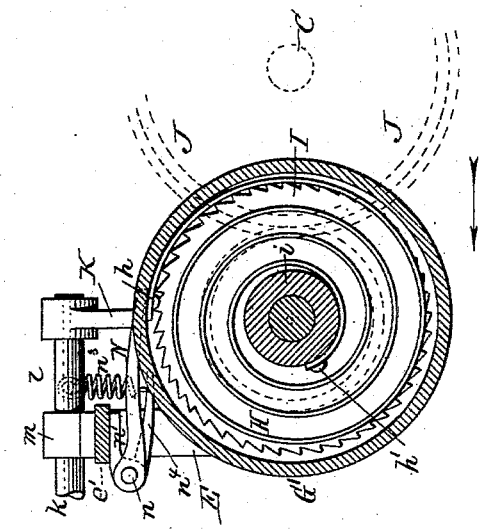
Figure 3:
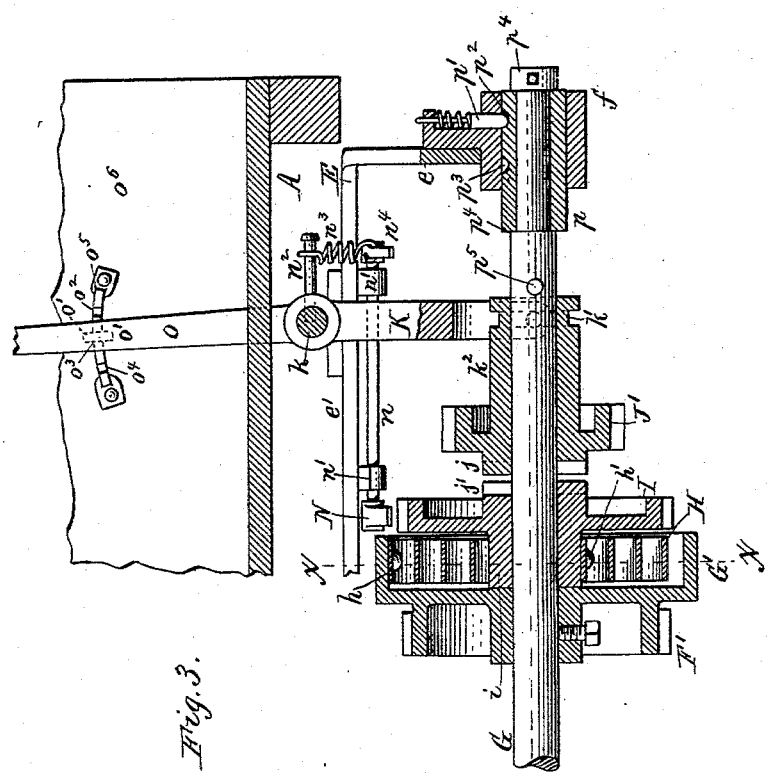

In the accompanying drawings, consisting of two sheets, Figure 1 is a longitudinal sectional elevation of a car-truck provided with my improved car brake and starter. Fig. 2 is a horizontal section in line $x\,x$, Fig. 1. Fig. 3 is a fragmentary cross-section in line $y\,y$, Fig. 1, on an enlarged scale. Fig. 4 is a cross-section in line $x\,x$, Fig. 3.

Like letters of reference refer to like parts in the several figures.

A represents the lower portion of the car-body; B, the wheels secured to axles C; D, the journal-boxes; $d$, the supporting-springs, and $d'$ the guides in which the boxes are arranged.

E represents an auxiliary rectangular frame secured to the inner sides of the axle-boxes D above the axles C and below the body A, and which supports my improved brake and starter. The frame E is composed of two longitudinal side bars $e\,e$ and two transverse bars $e'\,e'$, connected with the raised end portions of the side bars.

In Fig. 2 of the drawings a brake and starting mechanism is shown at each end of the car, so that the mechanism at either end can be operated, according to the direction in which the car moves. In this figure the mechanism at the right is shown in an operative position, the car moving in the direction of the arrow, while that at the left is shifted or disengaged, leaving the mechanism at rest.

F represents a gear-wheel secured to the axle C, and meshing with a similar gear-wheel F′, secured to a horizontal counter-shaft G. The latter is arranged in front of the axle C and supported in hangers $f$, secured to the side bars $e$ of the auxiliary frame E.

G′ represents a spring drum or casing formed on or secured to one side of the gear-wheel F′, so as to rotate therewith, and inclosing a coiled spring H. The latter is secured at its end $h$ to the inner side of the casing G′, and with its inner end $h'$ to an inwardly-projecting hub $i$, formed on one side of a ratchet-disk I. The latter is mounted loosely on the shaft G adjacent to the spring-casing G′, so as to be free to turn on the shaft.

J represents a gear-wheel of somewhat greater diameter than the gear-wheel F, and secured to the axle C. This wheel engages with a pinion J′, mounted loosely on the counter-shaft G adjacent to the ratchet-disk I. The pinion J′ is made movable toward and from the ratchet-disk I, and is provided on one side with a clutch-face $j$, which is adapted to engage with a similar clutch-face $j'$, formed on the side of the ratchet-disk I. By throwing this clutch into gear the ratchet-disk is caused to rotate in the same direction as the shaft G and drum G′, but at a greater velocity, which increased speed causes the inner end of the spring to advance faster than the outer end, and consequently causes the spring to be wound and retard the movement of the car.

K represents a depending clutch-lever, by which the pinion J′ is shifted, and which is secured to the inner end of a longitudinal rock-shaft $k$, arranged on the under side of the car-body. The lower bifurcated end of this lever engages in an annular groove $k'$, formed in an outward extension or hub $k^2$ of the pinion J′. The shaft K is composed, preferably, of two sections $l\,l'$, connected together by a universal joint $l^2$. The inner section $l$ supports the clutch-lever and is journaled in a bearing $m$ on the cross-bar $e'$ of the auxiliary frame E, and the outer section $l'$ is journaled at its front end in a bearing secured to the lower side of the car-platform A. This construction permits the necessary vertical and lateral play or motion of the car-body without causing the shaft $k$ and connecting parts to bend or bind.

N represents a detent-pawl arranged above the ratchet-disk I and adapted to engage with the latter and hold the same against backward movement. The pawl N is secured to one end of a short transverse rock-shaft $n$, arranged above and parallel with the countershaft G in bearings $n'$, secured to the adjacent cross-bar $e'$ of the auxiliary frame E. When the disk I and pinion J' are disengaged, as shown in Fig. 3, the pawl N is held above the disk I and out of engagement therewith by a radial arm $n^2$, secured to the inner section of the rock-shaft $k$, and connected by a spring $n^3$ with an inwardly-projecting arm $n^4$, secured to the pawl-shaft $n$. The spring $n^3$ is of such length and construction as to tend to press the pawl-actuating arm $n^4$ and the pawl N downwardly into engagement with the ratchet-disk I when the clutch-lever $k$ is moved inwardly to engage the pinion J' and disk I.

$o$ represents a hand-lever secured to the rock-shaft $k$ for actuating the same, and extending above the platform within convenient reach of the driver. The lever $o$ is provided with a tooth $o'$, which is adapted to engage in one of three notches $o^2$ $o^3$ $o^4$, formed in a locking-segment $o^5$, secured to the dash $o^6$ of the car.

The operation of my improved car brake and starter is as follows: When the car is moving in the direction indicated by the arrow in Fig. 2, the parts are held in the position shown in said figure by the hand-lever $o$. The wheel F on the axle rotates the wheel F', the spring-casing, and the counter-shaft. The disk I turns with the spring, and the wheel J rotates the pinion J'; but as the latter is disconnected from the disk I the spring is not strained or wound. When it is desired to stop the car, the pinion J' is thrown by the hand-lever into engagement with the ratchet-disk I. This movement of the hand-lever causes the pawl N to engage with the ratchet-disk by the downward movement of the arm $n^2$. By thus engaging the pinion J' and ratchet-disk I the latter is caused to rotate at a greater speed than the drum G' and in the same direction, so as to wind or strain the spring by the differential movement of its end fastenings. The resistance so offered by the spring causes the car to gradually reduce its speed and finally stop. During this winding of the spring the pawl N rides over the teeth of the ratchet-disk I. When the latter ceases to rotate, the pawl engages with the teeth and holds the disk against retrograde movement. The parts are then securely locked against forward movement by the resistance of the spring against the wheels F' F J and the pinion J', which latter locks the parts by its engagement with the disk I, and against backward movement by the pawl N engaging with the ratchet-disk I. When it is desired to start the car, the hand-lever $o$ is disengaged from the notch $o^2$ and moved back into engagement with the notch $o'$. This movement disengages the pinion J' from the ratchet-disk I and causes the spring $n^3$ to stretch and apply an upward tension to the pawl N, without, however, disengaging the latter from the ratchet-disk, as the spring is made so light as not to overcome the resistance of the pawl while the latter is engaged with the disk I. Upon disengaging the pinion J' and disk I the spring H rotates the drum G', gear-wheel F', gear-wheels F and J, and axle C, and moves the car forward. The unwinding of the spring continues until it has reached its normal state, when it carries or turns the disk I with it. As soon as the disk is thus released from backward pressure and begins to turn with the spring the pawl N is raised from the ratchet-disk by the spring $n^3$, so as to clear the same, thereby preventing rattling.

By winding the spring in the same direction in which the spring-drum rotates, but at a greater speed than the drum, a short and stiff spring can be employed, which, by reason of the slow winding movement, offers a gradual but effectual resistance and stops the car without violence and disagreeable jolting. The mechanism is controlled by a single lever, thereby making its manipulation very simple.

When a device of this kind is applied to each end of a car, as shown in Fig. 2, it is desirable to disengage the mechanism at the rear end of the car, which is not required for use, in order to avoid unnecessary friction and wear. For this purpose the countershaft G is journaled in longitudinally-movable boxes $p$, having a rectangular, polygonal, or other suitable cross-section, which are arranged to move lengthwise in corresponding openings formed in the hangers $f$, so as to hold these boxes against turning.

$p'$ represents a vertical spring-bolt arranged in an opening in the upper portion of one or both bearings $f$ of the shaft G, and which is adapted to engage with its lower rounded end in one of two notches $p^2$ $p^3$, formed in the upper sides of the boxes $p$. When the parts are in their working position, as shown at the right of Fig. 2, the bolt is in engagement with the notch $p^2$, and when the shaft G is shifted so as to disengage the parts, as shown at the left of said figure, the bolt is in engagement with the notch $p^3$. The journal portion of the shaft is reduced in diameter and provided at its outer end with a collar or shoulder $p^4$, so as to cause the box to move lengthwise with the shaft when the latter is shifted. When it is desired to shift the shaft so as to disengage the gear-wheels F and J from the wheels F' and J', the lever $o$ is moved toward the notch $p^3$, which movement causes the hub $k^2$ of the pinion J' to strike against a pin $p^5$ on the shaft G and shift the latter and its boxes $p$. This unusual outward pressure against the bearing-boxes $p$ causes the bolt $p'$ to rise out of the notch $p^2$ and ride over the top surface of the box until the lever $o$ has reached and engaged with the notch $o^3$, when the bolt $p'$ will register with the notch $p^3$ of the bearing-box and lock the shaft G and connecting parts against displacement.

It will thus be seen that the operation of stopping and starting the car, as well as shifting the shaft G, is performed by shifting the lever $o$.

I claim as my invention—

1. The combination, with the car-axle, of an actuating-spring and differential gears whereby the ends of the spring are rotated in the same direction with differential speed in winding the spring, substantially as set forth.

2. The combination, with the car-axle and a counter-shaft, of a retarding-spring mounted on said shaft, differential gears whereby the ends of the spring are rotated in the same direction, a detent whereby one end of the spring can be held against backward movement, and a clutch whereby the locked end of the spring can be disengaged from the car-axle, substantially as set forth.

3. The combination, with the car-axle and a counter-shaft, of a rotary spring-casing mounted on said shaft, gears connecting said casing with the axle, a rotary hub mounted on said shaft and provided with a ratchet-rim, a retarding-spring secured with its ends to said casing and to said hub, a clutch-sleeve mounted on said shaft and adapted to engage with said hub, and gears connecting said clutch-sleeve with the axle, substantially as set forth.

4. The combination, with the car-axle and a counter-shaft, of a rotary spring-casing mounted on said shaft, gears connecting said casing with the axle, a rotary hub provided with a ratchet-rim and mounted on said axle, a spring secured with its ends to said casing and hub, a clutch-sleeve mounted on said shaft, gears connecting said sleeve with the axle, a shifting-lever connected with the clutch-sleeve, and a detent-pawl engaging with the ratchet-rim and connected with the shifting-lever, substantially as set forth.

5. The combination, with the car-axle and a counter-shaft, of a rotary spring-casing mounted on said shaft, gears connecting said casing with the axle, a rotary hub provided with a ratchet-rim and mounted on said axle, a spring secured with its ends to said casing and hub, a clutch-sleeve mounted on said shaft, gears connecting said sleeve with the axle, a shifting-lever connected with the clutch-sleeve, a detent-pawl engaging with the ratchet-rim, and a spring interposed between said pawl and the shifting-lever, substantially as set forth.

6. The combination, with the car-axle, the counter-shaft, and its supporting-frame, of journal-boxes movable lengthwise of the counter-shaft in the supporting-frame, a spring-casing, spring, and clutch mounted on the counter-shaft, connecting gear-wheels, mounted, respectively, on the axle and on the counter-shaft, and mechanism whereby the counter-shaft can be moved lengthwise for engaging and disengaging said gear-wheels, substantially as set forth.

7. The combination, with the car-axle, the counter-shaft, and its supporting-frame, of journal-boxes movable lengthwise of the counter-shaft in the supporting-frame, automatic locking-bolts attached to the frame and engaging with said boxes, a spring mechanism mounted on the counter-shaft, connecting-gears mounted on the axle and on the counter-shaft, a shifting-lever engaging with said spring mechanism, and a stop on the counter-shaft, against which the shifting-lever is engaged by an excessive movement for moving the counter-shaft and the spring mechanism mounted thereon out of gear with the wheels on the axle, substantially as set forth.

8. The combination, with the car-body, the axles, and their journal-boxes, of a supporting-frame secured to said boxes, a counter-shaft journaled in said frame, a spring mechanism mounted on said counter-shaft, connecting-gears mounted on the axle and on the counter-shaft, a flexible longitudinal rock-shaft having its outer portion attached to the car-body and its inner portion to the supporting-frame, an actuating-arm connecting the inner portion of the rock-shaft with the spring mechanism, and a hand-lever secured to the outer portion of said rock-shaft, substantially as set forth.

Witness my hand this 19th day of August, 1889.

JOSIAH ROSS.

Witnesses:
JNO. J. BONNER,
F. C. GEYER.